US011799537B2

(12) United States Patent
Wu et al.

(10) Patent No.: US 11,799,537 B2
(45) Date of Patent: Oct. 24, 2023

(54) RADAR SIGNAL PROCESSING WITH FORWARD-BACKWARD MATRIX

(71) Applicant: NXP B.V., Eindhoven (NL)

(72) Inventors: Ryan Haoyun Wu, San Jose, CA (US); Dongyin Ren, East Brunswick, NJ (US); Michael Andreas Staudenmaier, Munich (DE); Maik Brett, Taufkirchen (DE)

(73) Assignee: NXP B.V., Eindhoven (NL)

( * ) Notice: Subject to any disclaimer, the term of this patent is extended or adjusted under 35 U.S.C. 154(b) by 64 days.

(21) Appl. No.: 17/387,128

(22) Filed: Jul. 28, 2021

(65) Prior Publication Data

US 2023/0053001 A1 Feb. 16, 2023

(51) Int. Cl.
*H04B 7/08* (2006.01)
*G01S 13/68* (2006.01)
*G01S 13/72* (2006.01)

(52) U.S. Cl.
CPC .............. *H04B 7/086* (2013.01); *G01S 13/68* (2013.01); *G01S 13/72* (2013.01)

(58) Field of Classification Search
CPC .......... H04B 7/086; G01S 13/68; G01S 13/72
See application file for complete search history.

(56) References Cited

U.S. PATENT DOCUMENTS

| | | | |
|---|---|---|---|
| 6,567,034 B1 | 5/2003 | Yu | |
| 6,653,973 B2 | 11/2003 | Yu | |
| 10,613,208 B2 | 4/2020 | Ali et al. | |
| 2005/0177348 A1* | 8/2005 | Lu | G05B 17/02 702/189 |
| 2006/0158374 A1* | 7/2006 | Rahamin | H01Q 9/44 342/368 |
| 2010/0123624 A1* | 5/2010 | Minear | H04B 7/084 342/372 |
| 2010/0265138 A1 | 10/2010 | Biem et al. | |
| 2012/0268315 A1* | 10/2012 | Tirkel | G01S 13/325 342/147 |

(Continued)

FOREIGN PATENT DOCUMENTS

| | | | |
|---|---|---|---|
| CN | 111157995 A | * 5/2020 | |
| FR | 3070766 B1 | * 9/2019 | G01S 13/72 |

(Continued)

OTHER PUBLICATIONS

Q. Y. Yin, Estimating Bearing Angles of Coherent Sources Using a Signal Matrix Pair, 1989, IEEE, 1307-1310 (Year: 1989).*

(Continued)

*Primary Examiner* — Timothy A Brainard
*Assistant Examiner* — Kenneth W Good (57) ABSTRACT

Aspects of the present disclosure are directed to radar signal processing apparatuses and methods. As may be implemented in accordance with one or more embodiments, digital signals representative of received reflections of radar signals transmitted towards a target are mathematically processed to provide or construct a matrix pencil based on or as a function of a forward-backward matrix. Eigenvalues of the matrix pencil are computed and an estimation of the direction of arrival (DoA) of the target is output based on the computed eigenvalues.

19 Claims, 7 Drawing Sheets

(56) References Cited

U.S. PATENT DOCUMENTS

| | | | |
|---|---|---|---|
| 2014/0340569 A1* | 11/2014 | Raskar | G01S 17/894 348/370 |
| 2020/0107324 A1* | 4/2020 | Kim | H04W 72/0466 |
| 2021/0337357 A1* | 10/2021 | Kassas | G01S 5/0205 |
| 2022/0294669 A1* | 9/2022 | Park | H04L 5/0016 |

FOREIGN PATENT DOCUMENTS

| | | | |
|---|---|---|---|
| GB | 1167671 A | * | 10/1969 |
| JP | 4131466 B2 | | 8/2008 |
| KR | 20090131344 A | * | 6/2018 |

OTHER PUBLICATIONS

17387128_2022-11-22_FR_3070766_B1_M.pdf, machine translation of FR_3070766_B1 (Year: 2019).*

17387128_2022-11-22_KR_20090131344_A_M.pdf, machine translation of KR_20090131344_A (Year: 2018).*

17387128_2022-11-22_CN_111157995_A_M.pdf, machine translation of CN_111157995_A (Year: 2020).*

Z. Yang and X. Wu, "Forward-Backward Hankel Matrix Fitting for Spectral Super-Resolution," 2020 28th European Signal Processing Conference (EUSIPCO), 2021, pp. 1886-1890.

Gaber, A., "A Study of Wireless Indoor Positioning Based on Matrix Pencil Algorithms and IEEE 802.11 ac", IEEE Transactions on Wireless Communications, vol. 14, No. 5, May 2015.

Yilmazer, N., "DOA Estimation using Matrix Pencil and ESPRIT Methods using Single and Multiple Snapshots", 2010 URSI International Symposium on Electromagnetic Theory, Aug. 16-19, 2010.

\* cited by examiner

RADAR SIGNAL PROCESSING WITH FORWARD-BACKWARD MATRIX

Aspects of various embodiments are directed to estimating a direction of arrival (DoA) of radar signal reflections from a target.

A variety of radar communications may be utilized for many different applications. For instance, radar communications may utilize high-resolution imaging radar technology in which computational and algorithmic enhancements are employed to achieve angular resolution superior to the natural resolution provisioned by the physical aperture of an antenna array of the radar system. However, achieving such resolution can be challenging. For instance, as radar targets may be illuminated by the same source, the received echoes can be highly correlated, resulting is an array signal covariance that may need to be further decorrelated before it can be useful. Therefore, an additional decorrelation process such as so-called spatial smoothing may be needed. Spatial smoothing may also be needed for obtaining multiple snapshots of array measurements. However, spatial smoothing approaches may require high computational cost.

These and other matters have presented challenges to radar implementations, for a variety of applications.

SUMMARY

Various example embodiments are directed to issues such as those addressed above and/or others which may become apparent from the following disclosure concerning radar signal processing and related determination of DoA of a target or targets.

In accordance with a particular embodiment, a method includes mathematically processing, via logic circuitry, digital signals representative of received reflections of radar signals transmitted towards a target to provide or construct a matrix pencil based on or as a function of a forward-backward matrix. Eigenvalues of the matrix pencil are computed, and an estimation of the DoA of the target is output based on the computed eigenvalues of the matrix pencil.

Another embodiment is directed to an apparatus comprising communication circuitry to transmit radar signals and to receive reflections of the radar signals from a target, and processing circuitry process representative signals. Specifically, the processing circuitry mathematically processes digital signals representative of the received reflections of the radar signals to provide or construct a matrix pencil based on or as a function of a forward-backward matrix. The processing circuitry further computes eigenvalues of the matrix pencil, and outputs an estimation of the DoA of the target based on the computed eigenvalues of the matrix pencil.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving processing radar signal reflections to ascertain characteristics of one or more targets from which the reflections are received. In certain implementations, aspects of the present disclosure have been shown to be beneficial when used in the context of automotive or other vehicular radar applications in which the DoA of a target is estimated using high-resolution radar technology, as may be implemented for autonomous driving (AD) and higher-level advanced driver assistance systems (ADAS). In a more particular embodiment, a matrix pencil is constructed using or based on a forward-backward matrix, and eigenvalues of the matrix pencil are utilized for estimating the DoA of a target. For instance, high computational efficiency may be achieved via the employment of a super Hankel matrix. In some implementations, such a matrix may replace the costly process of constructing and eigen-decomposing spatially smoothed signal covariance matrices. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In accordance with a particular embodiment digital signals, which are representative of received reflections of radar signals transmitted towards a target, are processed to provide or construct a matrix pencil based on or as a function of a forward-backward matrix. The reflections may be received in a radar circuit that transmits the radar signals, and in some implementations, the digital signals are processed as part of an input array measurement vector (e.g., which may utilize the transmitted signals). Eigenvalues (e.g., eigenvalue phases) of the matrix pencil may be computed, and an estimation of the direction of arrival (DoA) of the target may be generated/output based on the computed eigenvalues of the matrix pencil. For instance, such an output may be based on eigenvalues of the matrix pencil, and eigenvalue phases corresponding to certain of the eigenvalues having a magnitude within a predefined range. In some implementations, halved-degrees-of-freedom issues associated with the matrix pencil and/or the forward-backward matrix are computationally resolved and used with outputting the DoA estimation. Such approaches may be used to estimate the DoA with sufficiently high-resolution imaging based on resolving a number of targets greater than two-thirds the size of the array.

The forward-backward matrix may be constructed in a variety of manners. For instance, the forward-backward matrix may include or refer to a matrix having multiple concatenated sub-matrices. Each sub-matrix may be characterized as a diagonal-constant matrix having a diagonal direction consistent with either: each ascending diagonal from left to right being constant (e.g., Hankel-like) or each descending diagonal from left to right being constant (e.g., Toeplitz-like). The forward-backward matrix may include respective forward and backward matrices having the same number of rows and columns.

Mathematically processing as noted above may be carried out in a variety of manners. For instance, multiple matrices may be formed in which at least two are characterized as a diagonal-constant matrix having a diagonal direction consistent with either: each ascending diagonal from left to right being constant (e.g., Hankel-like), or each descending diagonal from left to right being constant. (e.g., Toeplitz-like). These may be used to construct a forward-backward matrix as noted. As another example, a forward matrix and a backward matrix respectively constructed of the digital signals may be concatenated, horizontally from left to right and constructing the matrix pencil from the matrices. The forward and backward matrices constructed of the reflections may be concatenated vertically from top to bottom, and the matrix pencil may be constructed from the matrices. In one embodiment, forward and backward Hankel matrices may be generated in which values of rows and columns of the forward and backward matrices are chosen so the resulting matrix is a square or has one more row than columns. In other embodiments, forward and backward Hankel matrices may be generated in which values of rows and columns of the forward and backward matrices are chosen so the resulting matrix is a wide matrix which has more columns than rows to achieve better signal to noise performance in exchange of fewer number of targets to be estimated. In one embodiment, forward and backward Toeplitz matrices may be generated, in which values of the rows and columns of the forward and backward matrices are chosen so the resulting matrix is a square or has one more column than rows. In other embodiments, forward and backward Toeplitz matrices may be generated in which values of rows and columns of the forward and backward matrices are chosen so the resulting matrix is a tall matrix which has more rows than columns to achieve better signal to noise performance in exchange of fewer number of targets to be estimated. Various such approaches may also be combined.

The steps of mathematically processing, computing and outputting may omit, for example, providing or estimating a number of signal sources and eliminating noise eigenvectors in an eigenvector matrix or eigenvector matrices. These steps may omit constructing and Eigen-decomposing spatially smoothed signal covariance matrices. Further, these steps may include providing the DoA within an angular resolution of less than 0.05 in a normalized frequency scale of 0-1.

Another embodiment is directed to an apparatus having communication circuitry and processing circuitry. The communication circuitry transmits radar signals and receives reflections of the radar signals from a target. The processing circuitry mathematically processes digital signals representative of the received reflections of the radar signals (e.g., as part of an input array measurement vector) to provide or construct a matrix pencil based on or as a function of a forward-backward matrix. The processing circuitry further computes eigenvalues of the matrix pencil, and outputs an estimation of the DoA of the target based on the computed eigenvalues.

The processing circuitry may operate in a variety of manners. In a particular embodiment, the processing circuitry forms multiple matrices, at least two of which are characterized as a diagonal-constant matrix having a diagonal direction consistent with either: each ascending diagonal from left to right being constant, or each descending diagonal from left to right being constant.

Further, a variety of forward-backward matrices may be utilized. For instance, the forward-backward matrix may include or refer to a matrix having multiple concatenated sub-matrices, each of which is characterized as a diagonal-constant matrix having a diagonal direction consistent with either: each ascending diagonal from left to right being constant, or each descending diagonal from left to right being constant.

Figure 1:
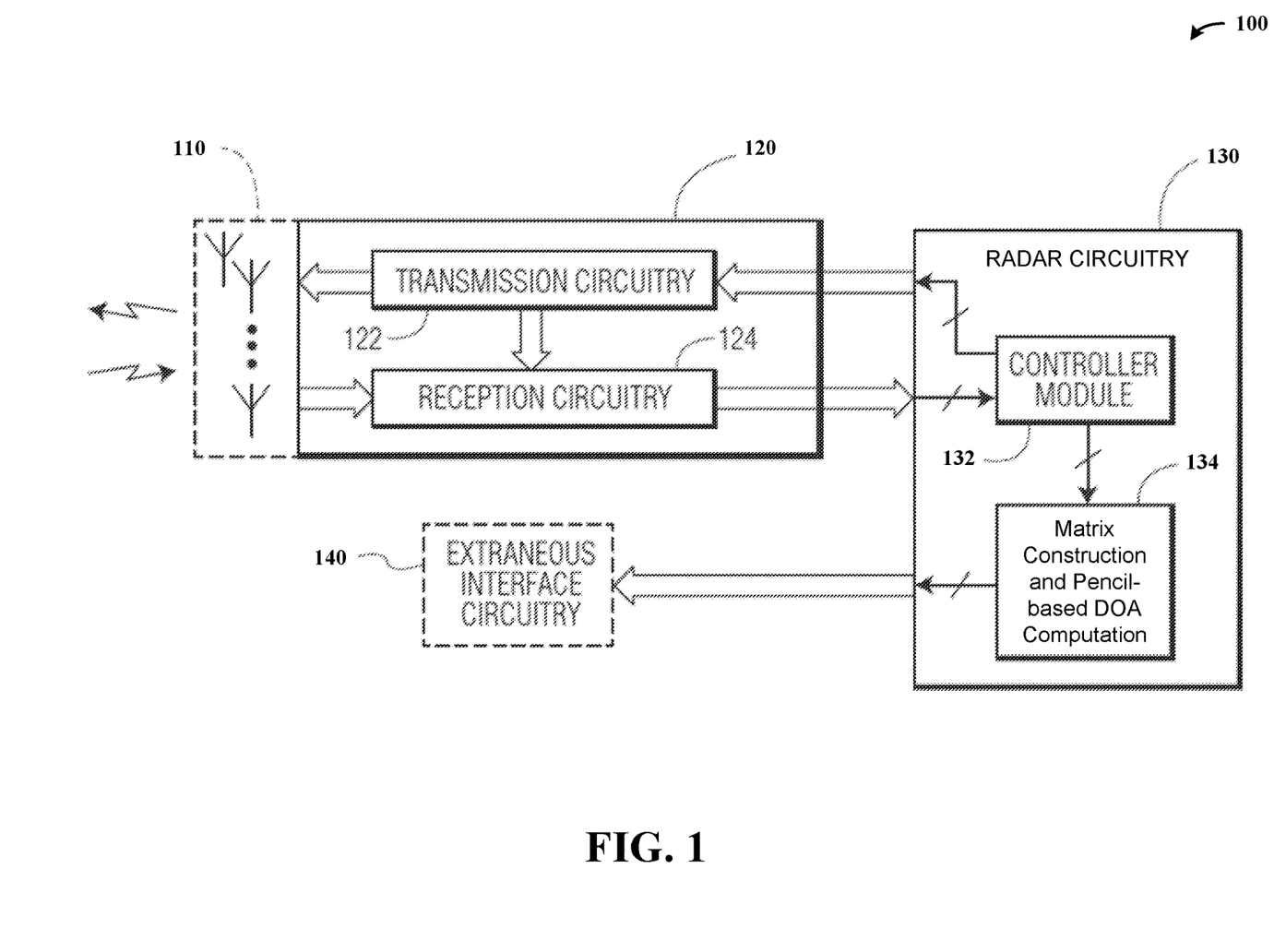
FIG. 1 is a system-level diagram illustrating an example radar communications system/apparatus, in accordance with the present disclosure.

Turning now to the figures, FIG. 1 shows a radar apparatus 100, as may be implemented in accordance with one or more embodiments. The apparatus 100 includes an antenna array 110, radar communication circuitry 120, and radar processing circuitry 130 (which may further interface with interface circuitry 140, for example automotive interface circuitry). The antenna array 110 includes a plurality of antennas, and the radar communication circuitry 120 includes transmission circuitry 122 and reception circuitry 124 (e.g., a plurality of transmitters and receivers). The radar processing circuitry 130 (e.g., radar MCPU) includes a controller module 132, as well as matrix construction and pencil-based DoA computation circuitry 134.

These components of apparatus 100 are operable to provide radar communications, in connection with signals communicated with the radar processing circuitry 130, utilizing time-frequency domain oversampling, and as may be implemented in accordance with one or more embodiments herein. For instance, positional characteristics including DoA of a target from which radar signals transmitted by the transmission circuitry 122 via the antenna array 110, and which are reflected from the target and received by the reception circuitry via the antenna array, may be ascertained by constructing a matrix pencil based on or as a function of a forward-backward matrix as characterized herein. Eigenvalues of the matrix pencil are computed and utilized to estimate the DoA. In certain embodiments, the transmission circuitry 122 and reception circuitry 124 are respectively implemented in accordance with the transmitter and receiver circuitry as characterized in communication circuitry 220 in FIG. 2.

Figure 2:
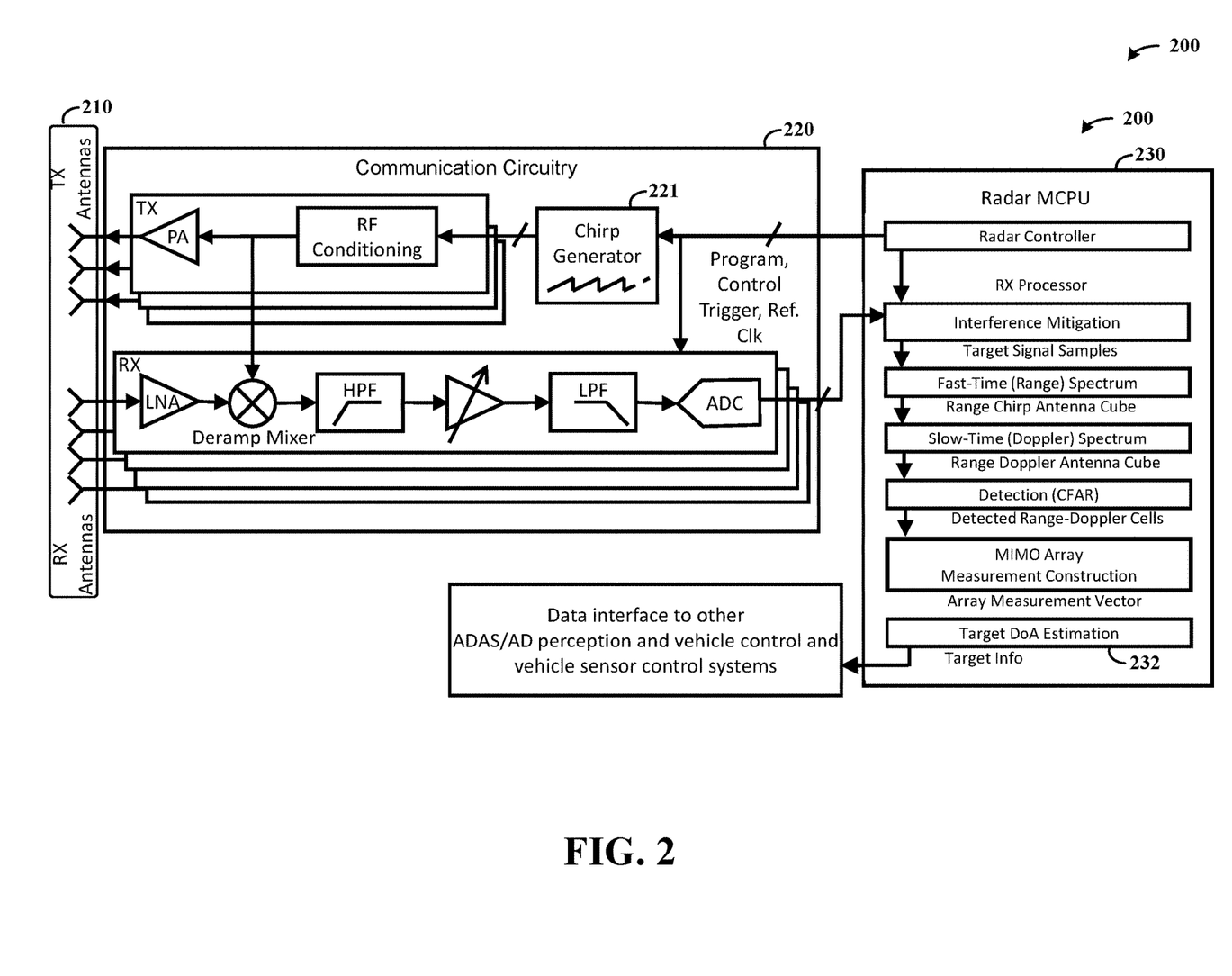
FIG. 2 shows notional multi-input, multi-output (MIMO) linear-chirp FMCW radar apparatus with forward-backward matrix DoA determination, in accordance with the present disclosure.

FIG. 2 shows notional multi-input, multi-output (MIMO) linear-chirp FMCW radar apparatus 200 with forward-backward matrix DoA determination, as may be utilized in accordance with one or more embodiments. The apparatus 200 includes an antenna array 210, communication circuitry 220 and radar processing circuitry 230. The communication circuitry 220 includes a plurality of transmitters and receivers (e.g., three transmitters and four receivers). The transmitters may include a chirp generator 221 operable to generate respective chirps, and may include other transmission circuitry such as conditioning and amplifier circuits, and operate in response to radar control circuitry within the radar processing circuitry 230.

The receivers may include amplifier, filters and other circuits as useful for receiving radar signals. For instance, each receiver may mix a return radar reflection with a transmitted chirp and filter the result to generate deramped IF (intermediate frequency) signals to be sampled by analog-to-digital converters (ADCs) and processed by a digital signal processing (DSP) unit to produce range and Doppler responses for each receive channel. The range-Doppler response maps of the receivers from the transmitted signals may be aggregated to form a complete MIMO array measurement data cube of range-Doppler response maps of antenna elements of a constructed MIMO virtual array. The range-Doppler responses may be non-coherently integrated and target detection may be attempted on the energy-combined range-Doppler map. A detection algorithm, such as may relate to variants of a CFAR algorithm, may be used to identify range-Doppler cells in which targets may be present. For each detection cell, the array measurement vector may then be extracted and processed for identifying the incident angles of any target returns contained in the cell.

Reflected radar signals received via the antenna array 210 and communication circuitry 220 are passed to the radar processing circuitry 230. The received signals are processed accordingly, including target DoA estimation at block 232 using a forward-backward matrix and matrix pencil as characterized herein (e.g., as with FIG. 1). The radar processing circuitry 230 may further carry out angle estimation and target tracking, using output array vectors, for tracking positional characteristics of targets from which reflections are received. Such target information may be provided via a data interface to external systems (e.g., automotive).

Figure 3:
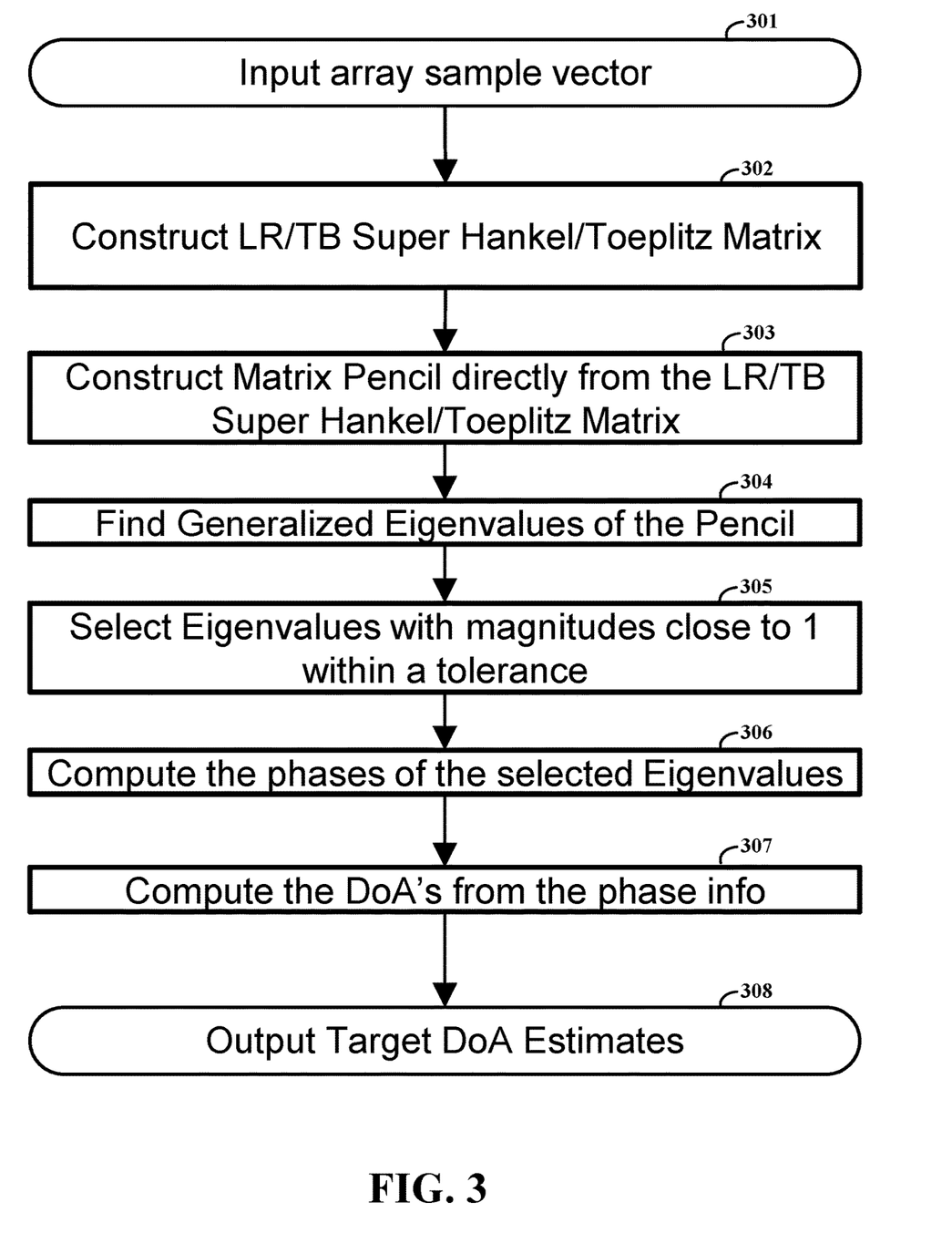
FIG. 3 shows an array sampling process with matrix calculation, in accordance with the present disclosure.

FIG. 3 shows an array sampling process with matrix calculation, in accordance with the present disclosure. At block 301, an array sample vector corresponding to radar reflections is input and a left-right, top-bottom (LR/TB) super Hankel/Toeplitz matrix is constructed at block 302. At block 303, a matrix pencil is computed directly from the LR/TB super Hankel/Toeplitz matrix, and generalized eigenvalues of the pencil are determined at block 304. Those eigenvalues with magnitudes close to 1 (within a tolerance) are selected at block 305 and their phases are computed at block 306. At block 307, the DoA of a target from which the radar reflections are received is computed from the phase information and DoA estimates of the target are output at block 308. Such an approach may, for example, utilize computations as characterized above and/or with FIGS. 4-7 that follow.

Figure 4:
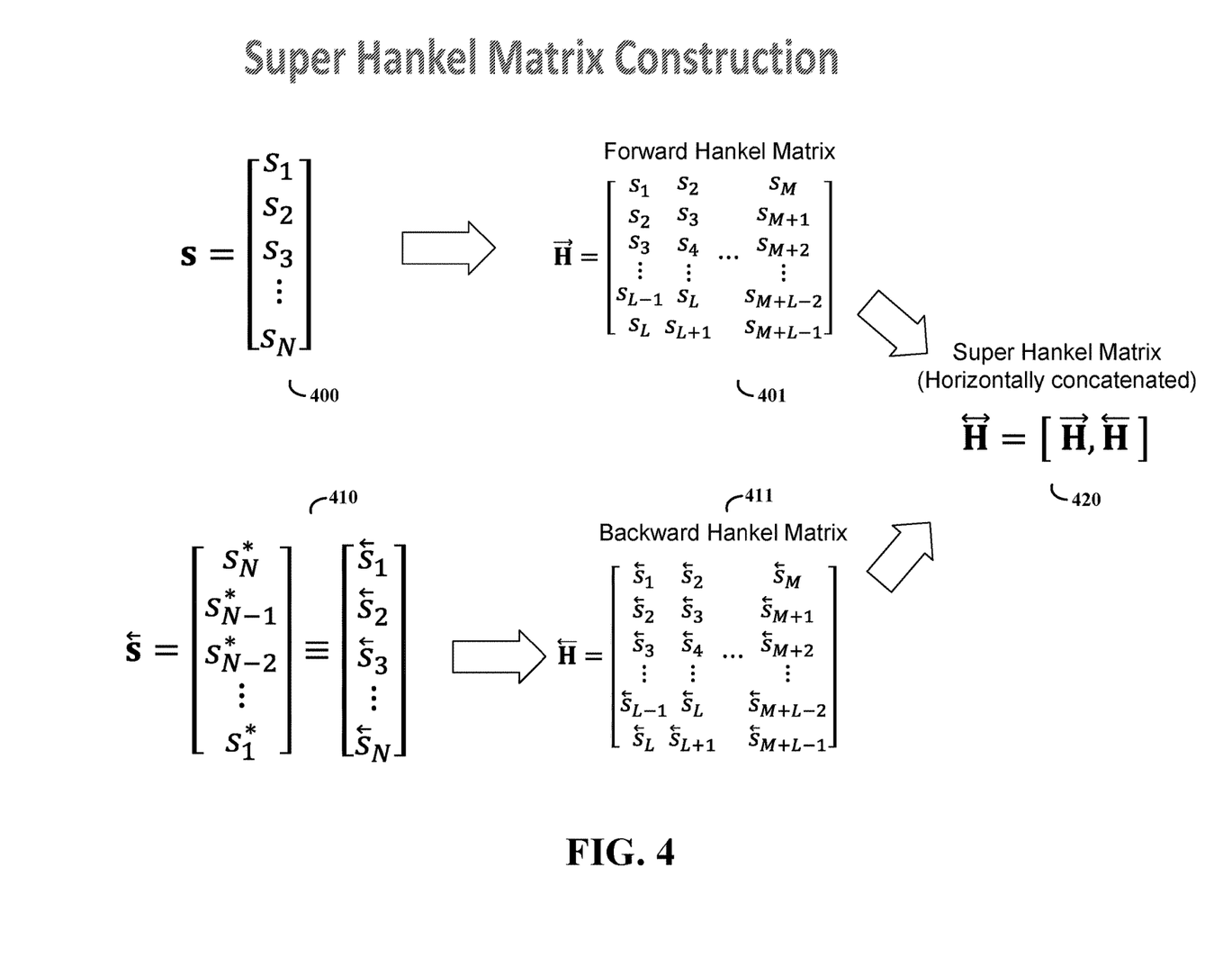
FIG. 4 shows Hankel matrix construction with horizontal concatenation, in accordance with the present disclosure.

FIG. 4 shows Hankel matrix construction with horizontal concatenation, in accordance with the present disclosure. At 400 an array vector s is used to generate a forward Hankel matrix 401, and a backwards array vector S at 410 is used to generate a backwards Hankel matrix 411. A left-right (LR) super Hankel matrix 420 is then formed by concatenating the forward and backward Hankel matrices 401 and 411 horizontally.

The forward and backward Hankel matrices may be constructed independently from the array measurements. For instance, for a vector of N elements, $$S=[s_1, s_2, \ldots, s_N]^T \text{ or } [s_1, s_2, \ldots, s_L, s_{L+1}, \ldots s_{L+M-1}]^T,$$

wherein N=L+M−1, two sub-vectors overlapped on the L-th element may be formed. These sub-vectors, $[s_1, s_2, \ldots, s_L]^T$ and $[s_L, s_{L+1}, \ldots s_{L+M-1}]^T$, span the first column and the last row of the forward Hankel matrix 401, respectively.

The backward Hankel matrix may be formed similarly, in which the vector is index-reversed and complex conjugated before the construction. Specifically, a backward array measurement vector $\tilde{s} = [\tilde{s}_1, \tilde{s}_2, \ldots \tilde{s}_N]^T \equiv [s_N^*, s_{N-1}^*, \ldots, s_1^*]^T$ may be formed and two sub-vectors $[\tilde{s}_1, \tilde{s}_2, \ldots, \tilde{s}_L]^T$ and $[\tilde{s}_L, \tilde{s}_{L+1}, \tilde{s}_{L+M-1}]^T$ are constructed. A backward Hankel matrix 411 is then constructed by spanning the first column and the last row of the Backward Hankel matrix with the two sub-vectors respectively and setting anti-diagonal elements to be equal valued.

Figure 5:
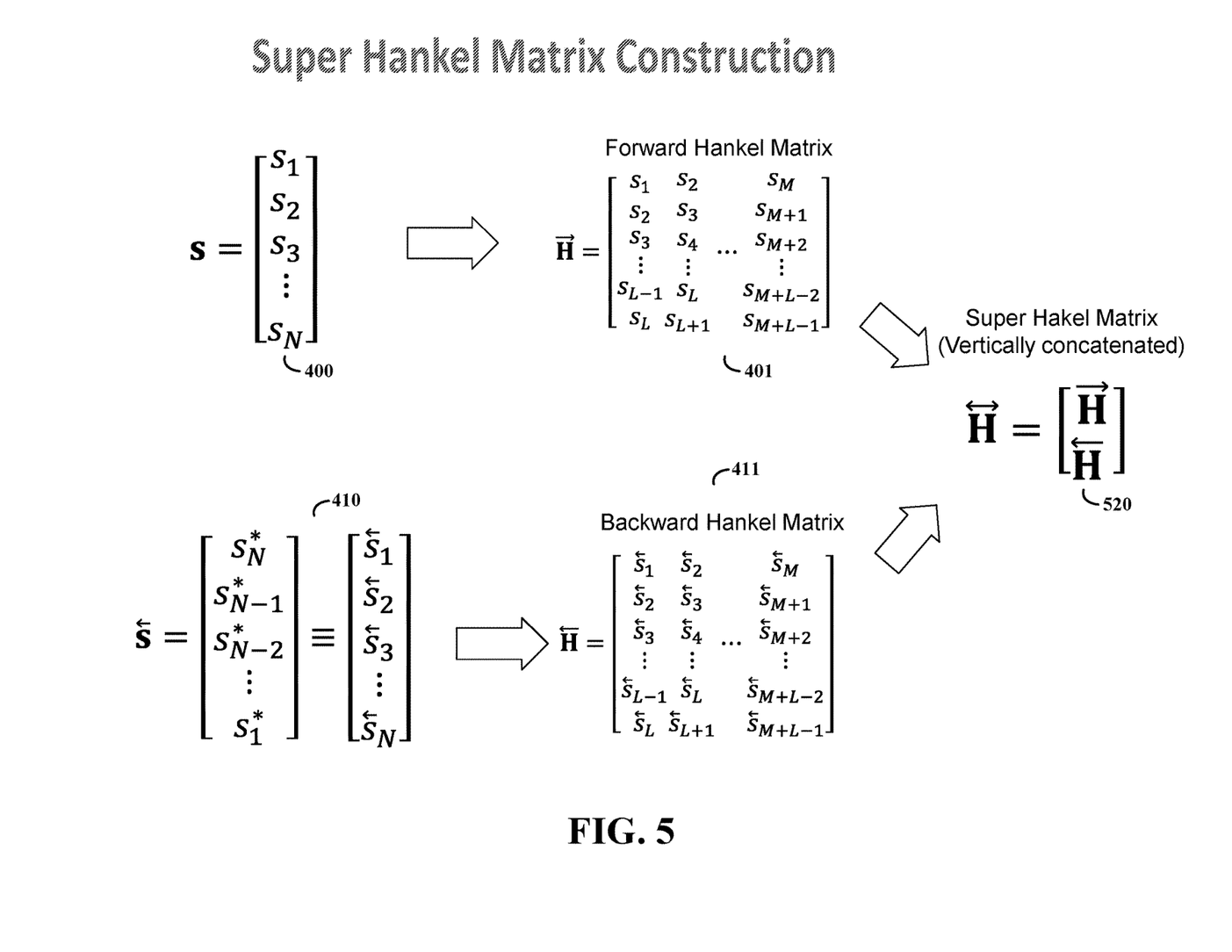
FIG. 5 shows Hankel matrix construction with vertical concatenation, in accordance with the present disclosure.

FIG. 5 shows Hankel matrix construction with vertical concatenation, in accordance with the present disclosure. A top-bottom (TB) super Hankel matrix 520 is formed by concatenating the forward and backward Hankel matrices 401 and 411 vertically.

Figure 6:
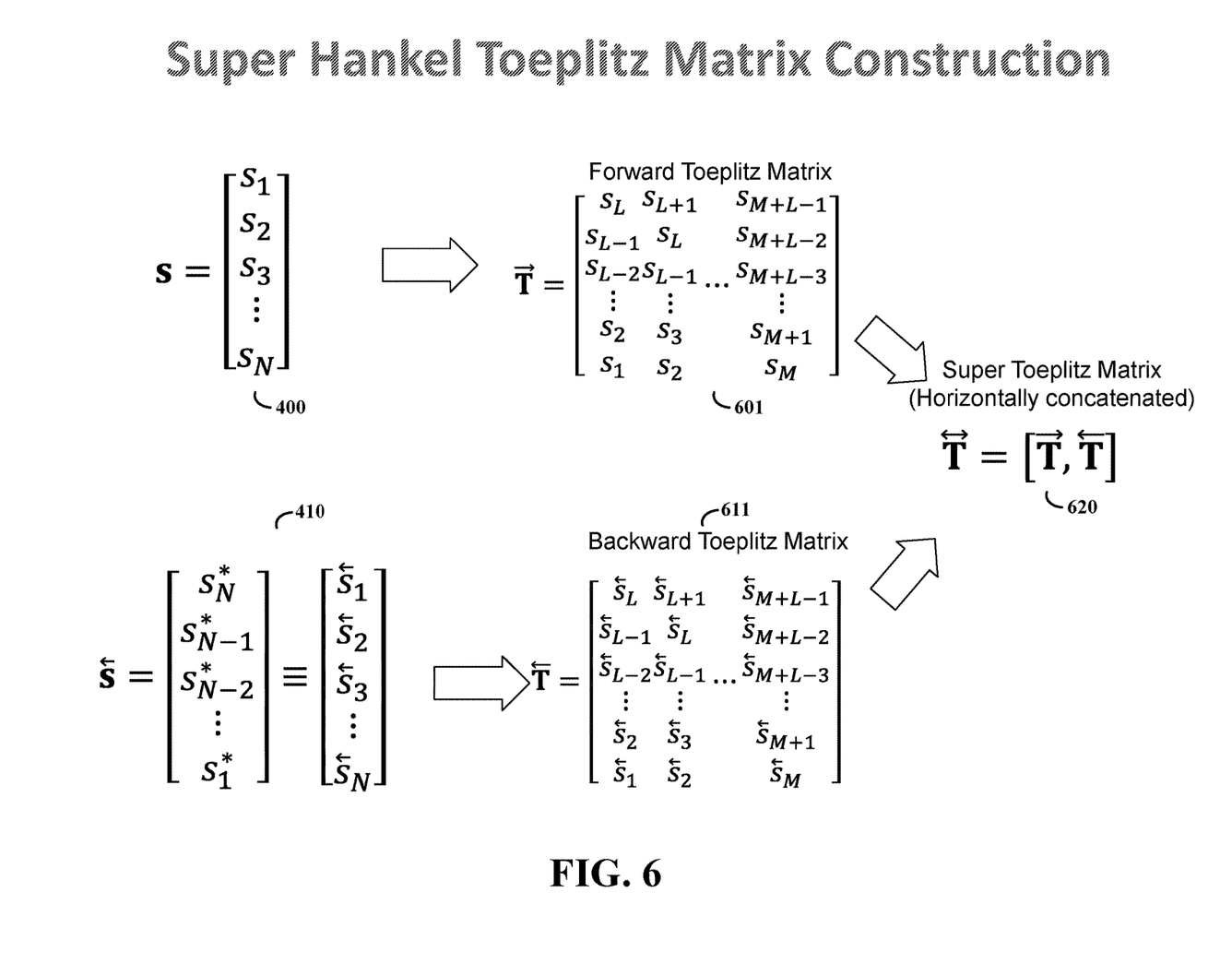
FIG. 6 shows Toeplitz matrix construction with horizontal concatenation, in accordance with the present disclosure.

FIG. 6 shows Toeplitz matrix construction with horizontal concatenation, in accordance with the present disclosure in which a horizontally concatenated super Toeplitz matrix (LR super Toeplitz matrix) is formed by concatenating the forward and backward Hankel matrices. Array vector s (400) is used to generate a forward Toeplitz matrix 601, and backwards array vector S (410) is used to generate a backwards Toeplitz matrix 611. For the vector 400 of N elements, $$s=[s_1, s_2, \ldots, s_N]^T \text{ or } [s_1, s_2, \ldots, s_{L+1}, \ldots s_{L+M-1}]^T,$$

where N=L+M−1, two sub-vectors $[s_L, s_{L-1}, \ldots, s_1]^T$ and $[s_L, s_L+1, \ldots s_{L+M-1}]^T$, overlapped on the first element ($s_L$), may be formed for construction of a super Toeplitz matrix 620. These sub-vectors, $[s_L, s_{L-1}, \ldots, s_1]^T$ and $[s_L, s_{L+1}, \ldots s_{L+M-1}]^T$, span the first column and the first row of the forward Toeplitz matrix 601, respectively. Two index-reversed and complex conjugated sub-vectors $[\tilde{s}_L, \tilde{s}_{L-1}, \ldots, \tilde{s}_1]^T$ and $[\tilde{s}_L, \tilde{s}_{L+1}, \ldots \tilde{s}_{L+M-1}]^T$ are constructed. The backward Toeplitz matrix 611 is constructed by spanning the first column and the first row of the backward Toeplitz matrix with the two sub-vectors respectively (e.g., and diagonal elements set to be equal valued).

Figure 7:
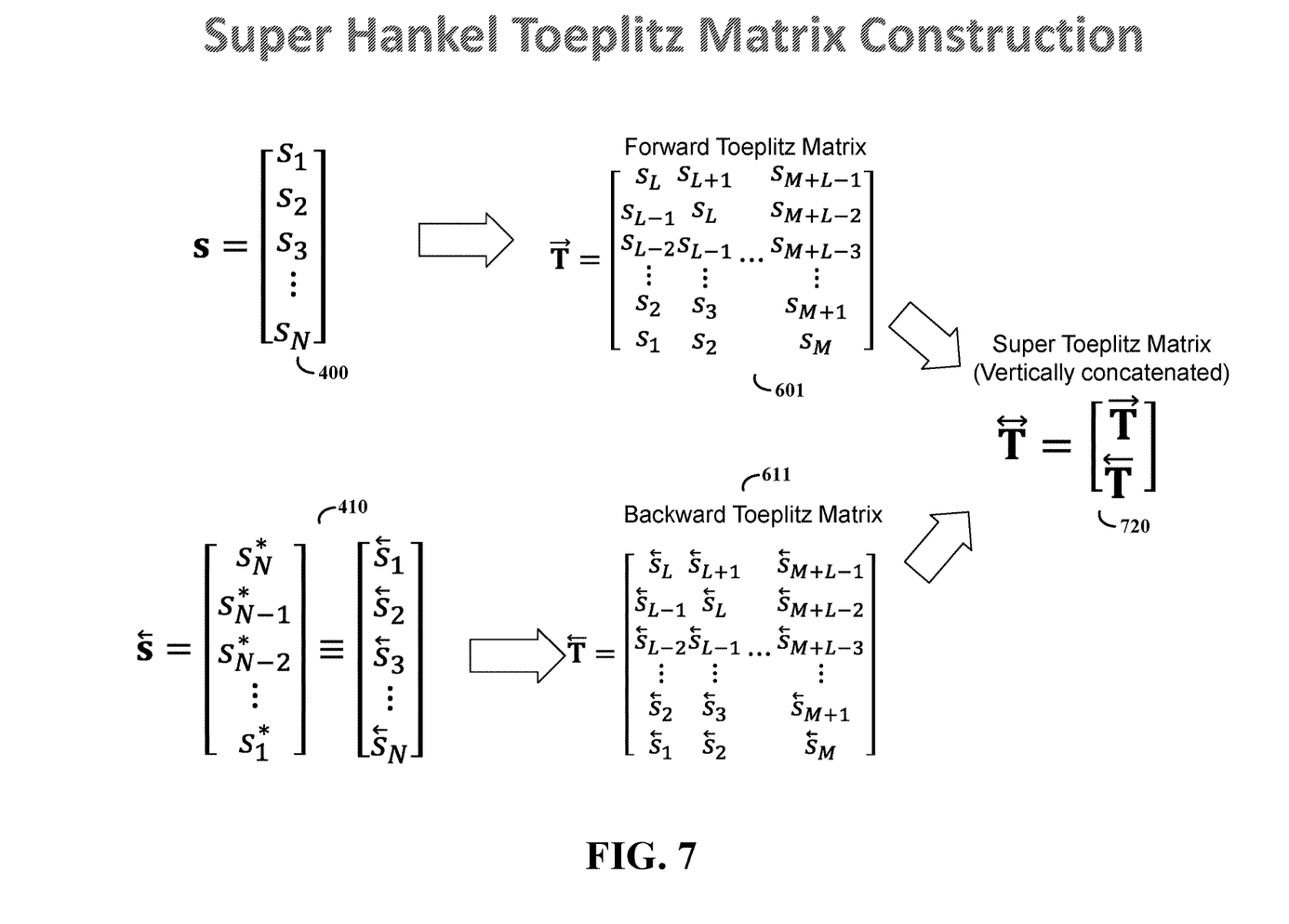
FIG. 7 shows Toeplitz matrix construction with vertical concatenation, in accordance with the present disclosure.

FIG. 7 shows Toeplitz matrix construction with vertical concatenation, in accordance with the present disclosure. A vertically concatenated super Toeplitz matrix (TB super Toeplitz matrix) 720 is formed by concatenating the forward and backward Toeplitz matrices.

Referring to FIGS. 4-7, 2L targets are modelled in the TB super Hankel/Toeplitz instead of 2M which translate to index from 1 to L in forward Hankel/Toeplitz matrix and index from L+1 to 2L in the backward Hankel/Toeplitz matrix. Accordingly, four different Super Hankel/Toeplitz matrices may thus be computed by:

1) concatenating the Forward and Backward Hankel matrices horizontally to form the Left-Right (LR) Super Hankel matrix;

2) concatenating the Forward and Backward Hankel matrices vertically to form the Top-Bottom (TB) Super Hankel matrix;
3) concatenating the Forward and Backward Toeplitz matrices horizontally to form the Left-Right (LR) Super Toeplitz matrix; and
4) concatenating the Forward and Backward Toeplitz matrices horizontally to form the Top-Bottom (TB) Super Toeplitz matrix.

The sizes of the forward and backward Hankel submatrices may be identical and share the dimensions (L rows and M columns). The values of L and M may be chosen to so the final LR super Hankel matrix/Toeplitz matrix, which is of the size of L rows by 2M columns, is square or a one-row extra tall matrix (e.g., having one more row than columns), which may be implemented to maximize the number of targets detectable. Similarly, the values of L and M may be chosen to so the TB super Hankel matrix/Toeplitz matrix, which is of the size of 2L rows by M columns, is square or a one-column extra wide matrix (e.g., having 1 more columns than rows), as may be implemented to maximize the number of targets detectable. Other sizes of the matrices can be utilized for attaining higher signal to noise performance with fewer targets to be estimated.

Once the construction of the LR/TB Super Hankel/Toeplitz matrix is complete. The matrix pencil pair may be directly formed from the super Hankel/Toeplitz matrix and their general eigenvalues may be estimated. Final DoA estimates may be computed from the phase information of a subset of the eigenvalues whose magnitudes are closest to 1 within a given tolerance.

Matrix pencils as referred to herein may be computed in a variety of manners. The following discussion exemplifies such manners, as may be implemented in accordance with one or more embodiments. For instance, the following approach may be implemented with the method depicted in FIG. 3, and/or with one or more of the matrix construction approaches depicted in FIGS. 4-7.

Beginning with a horizontally concatenated super Hankel/Toeplitz matrix, a Left-right (LR) super Hankel matrix is formed by concatenating the forward and backward Hankel matrices horizontally and can be written in the following equation (2M targets modelled in the Super Hankel):

$$\vec{H}_{Signal} = [\vec{H}_{Signal} \ \vec{H}_{Signal}] =$$

$$\begin{bmatrix} \sum_{i=1}^{M} \alpha_i z_i^0 & \sum_{i=1}^{M} \alpha_i z_i^1 & \sum_{i=1}^{M} \alpha_i z_i^{M-1} & \sum_{i=M+1}^{2M} \alpha_i^* z_i^{-M-L+2} & \sum_{i=M+1}^{2M} \alpha_i^* z_i^{-M-L+3} & \sum_{i=M+1}^{2M} \alpha_i z_i^{-L+1} \\ \sum_{i=1}^{M} \alpha_i z_i^1 & \sum_{i=1}^{M} \alpha_i z_i^2 & \sum_{i=1}^{M} \alpha_i z_i^M & \sum_{i=M+1}^{2M} \alpha_i^* z_i^{-M-L+3} & \sum_{i=M+1}^{2M} \alpha_i^* z_i^{-M-L+4} & \sum_{i=M+1}^{2M} \alpha_i^* z_i^{-L+2} \\ \sum_{i=1}^{M} \alpha_i z_i^2 & \sum_{i=1}^{M} \alpha_i z_i^3 & \cdots & \sum_{i=1}^{M} \alpha_i z_i^{M+1} & \sum_{i=M+1}^{2M} \alpha_i^* z_i^{-M-L+4} & \sum_{i=M+1}^{2M} \alpha_i^* z_i^{-M-L+5} & \sum_{i=M+1}^{2M} \alpha_i^* z_i^{-L+2} \\ \vdots & \vdots & \vdots & \vdots & \vdots & \vdots \\ \sum_{i=1}^{M} \alpha_i z_i^{L-2} & \sum_{i=1}^{M} \alpha_i z_i^{L-1} & \sum_{i=1}^{M} \alpha_i z_i^{M+L-3} & \sum_{i=M+1}^{2M} \alpha_i^* z_i^{-M} & \sum_{i=M+1}^{2M} \alpha_i^* z_i^{-M+1} & \sum_{i=M+1}^{2M} \alpha_i^* z_i^{-1} \\ \sum_{i=1}^{M} \alpha_i z_i^{L-1} & \sum_{i=1}^{M} \alpha_i z_i^L & \sum_{i=1}^{M} \alpha_i z_i^{M+L-2} & \sum_{i=M+1}^{2M} \alpha_i^* z_i^{-M+1} & \sum_{i=M+1}^{2M} \alpha_i^* z_i^{-M+2} & \sum_{i=M+1}^{2M} \alpha_i^* z_i^0 \end{bmatrix}_{L \times 2M}$$

$$(L \geq 2M) = \begin{bmatrix} z_1^0 & \cdots & z_M^0 & z_{M+1}^{-M-L+2} & \cdots & z_{2M}^{-M-L+2} \\ z_1^1 & \cdots & z_M^1 & z_{M+1}^{-M-L+3} & \cdots & z_{2M}^{-M-L+3} \\ \vdots & & \vdots & \vdots & & \vdots \\ z_1^{L-1} & \cdots & z_M^{L-1} & z_{M+1}^{-M+1} & \cdots & z_{2M}^{-M+1} \end{bmatrix} \begin{bmatrix} \alpha_1 & \cdots & 0 & & & \\ \vdots & \ddots & \vdots & & 0 & \\ 0 & \cdots & \alpha_M & & & \\ & & & \alpha_{M+1}^* & \cdots & 0 \\ & 0 & & \vdots & \ddots & \vdots \\ & & & 0 & \cdots & \alpha_{2M}^* \end{bmatrix}$$

$$\begin{bmatrix} z_1^0 & z_1^1 & z_1^{M-1} & & & \\ \vdots & \vdots & \cdots & \vdots & & 0 & \\ z_M^0 & z_M^1 & z_M^{M-1} & & & \\ & & & z_{M+1}^0 & z_{M+1}^1 & z_{M+1}^{M-1} \\ & 0 & & \vdots & \vdots & \cdots & \vdots \\ & & & z_{2M}^0 & z_{2M}^1 & z_{2M}^{M-1} \end{bmatrix} = \vec{Z}\vec{F}\vec{Y}$$

Likewise, the horizontally concatenated super Toeplitz matrix (LR super Toeplitz Matrix) may be formed by concatenating the forward and backward Hankel matrices and can be written in the following equation. Super Toeplitz Matrix (2M targets modelled in the Super Toeplitz):

$$\overleftrightarrow{T}_{Signal} = [\overrightarrow{T}_{Signal} \ \overleftarrow{T}_{Signal}] =$$

$$\begin{bmatrix} \sum_{i=1}^{M} \alpha_i z_i^{L-1} & \sum_{i=1}^{M} \alpha_i z_i^{L} & \sum_{i=1}^{M} \alpha_i z_i^{M+L-2} & \sum_{i=M+1}^{2M} \alpha_i^* z_i^{-M+1} & \sum_{i=M+1}^{2M} \alpha_i^* z_i^{-M+2} & \sum_{i=M+1}^{2M} \alpha_i z_i^{0} \\ \sum_{i=1}^{M} \alpha_i z_i^{L-2} & \sum_{i=1}^{M} \alpha_i z_i^{L-1} & \sum_{i=1}^{M} \alpha_i z_i^{M+L-3} & \sum_{i=M+1}^{2M} \alpha_i^* z_i^{-M} & \sum_{i=M+1}^{2M} \alpha_i^* z_i^{-M+1} & \sum_{i=M+1}^{2M} \alpha_i^* z_i^{-1} \\ \sum_{i=1}^{M} \alpha_i z_i^{L-3} & \sum_{i=1}^{M} \alpha_i z_i^{L-2} & \cdots & \sum_{i=1}^{M} \alpha_i z_i^{M+L-4} & \sum_{i=M+1}^{2M} \alpha_i^* z_i^{-M-1} & \sum_{i=M+1}^{2M} \alpha_i^* z_i^{-M} & \sum_{i=M+1}^{2M} \alpha_i^* z_i^{-2} \\ \vdots & \vdots & & \vdots & \vdots & \vdots & \vdots \\ \sum_{i=1}^{M} \alpha_i z_i^{1} & \sum_{i=1}^{M} \alpha_i z_i^{2} & \sum_{i=1}^{M} \alpha_i z_i^{M} & \sum_{i=M+1}^{2M} \alpha_i^* z_i^{-M-L+3} & \sum_{i=M+1}^{2M} \alpha_i^* z_i^{-M-L+4} & \sum_{i=M+1}^{2M} \alpha_i^* z_i^{-L+2} \\ \sum_{i=1}^{M} \alpha_i z_i^{0} & \sum_{i=1}^{M} \alpha_i z_i^{1} & \sum_{i=1}^{M} \alpha_i z_i^{M-1} & \sum_{i=M+1}^{2M} \alpha_i^* z_i^{-M-L+2} & \sum_{i=M+1}^{2M} \alpha_i^* z_i^{-M-L+3} & \sum_{i=M+1}^{2M} \alpha_i^* z_i^{-L+1} \end{bmatrix}_{L \times 2M} =$$

$$\begin{bmatrix} z_1^{L-1} & \cdots & z_M^{L-1} & z_{M+1}^{-M+1} & \cdots & z_{2M}^{-M+1} \\ z_1^{L-2} & \cdots & z_M^{L-2} & z_{M+1}^{-M} & \cdots & z_{2M}^{-M} \\ \vdots & & \vdots & \vdots & & \vdots \\ z_1^{0} & \cdots & z_M^{0} & z_{M+1}^{-M-L+2} & \cdots & z_{2M}^{-M-L+2} \end{bmatrix} \begin{bmatrix} \alpha_1 & \cdots & 0 & & & \\ \vdots & \ddots & \vdots & & 0 & \\ 0 & \cdots & \alpha_M & & & \\ & & & \alpha_{M+1}^* & \cdots & 0 \\ & 0 & & \vdots & \ddots & \vdots \\ & & & 0 & \cdots & \alpha_{2M}^* \end{bmatrix}$$

$$\begin{bmatrix} z_1^0 & z_1^1 & & z_1^{M-1} & & & \\ \vdots & \vdots & \cdots & \vdots & & 0 & \\ z_M^0 & z_M^1 & & z_M^{M-1} & & & \\ & & & & z_{M+1}^0 & z_{M+1}^1 & & z_{M+1}^{M-1} \\ & 0 & & & \vdots & \vdots & \cdots & \vdots \\ & & & & z_{2M}^0 & z_{2M}^1 & & z_{2M}^{M-1} \end{bmatrix} = \overleftrightarrow{U} \overrightarrow{F} \overleftrightarrow{Y}$$

Where the number of sources is known, while creating the LR Super Hankel/Toeplitz Matrix one can make $2M=N_s$ (or $N_s+1$ for odd values) so the number of eigenvalues to be computed equals the number of sources, which may improve the SNR as a stronger averaging will take place in the matrix pencil.

The left-right (LR) super Hankel/Toeplitz matrix may present a rotational invariant property for use in the instant Matrix Pencil approach. The $\overleftrightarrow{Z}$ matrix in the LR super Hankel matrix model may be written in the following form.

$$\overleftrightarrow{Z} = \begin{bmatrix} Z_1^0 & \cdots & Z_M^0 & Z_{M+1}^{-M-L+2} & \cdots & Z_{2M}^{-M-L+2} \\ Z_1^1 & \cdots & Z_M^1 & Z_{M+1}^{-M-L+3} & \cdots & Z_{2M}^{-M-L+3} \\ \vdots & & \vdots & \vdots & & \vdots \\ Z_1^{L-2} & \cdots & Z_M^{L-2} & Z_{M+1}^{-M} & \cdots & Z_{2M}^{-M} \\ Z_1^{L-1} & \cdots & Z_M^{L-1} & Z_{M+1}^{-M+1} & \cdots & Z_{2M}^{-M+1} \end{bmatrix}$$

A pair of submatrices ($\overleftrightarrow{Z}_A$ and $\overleftrightarrow{Z}_B$) that are used to form the matrix pencil in the later step are modelled by removing the last row of $\overleftrightarrow{Z}$ to form $\overleftrightarrow{Z}_A$, and by removing the first row of $\overleftrightarrow{Z}$ to form $\overleftrightarrow{Z}_B$, which can be written in the following form.

$$\overleftrightarrow{Z}_A = \begin{bmatrix} Z_1^0 & \cdots & Z_M^0 & Z_{M+1}^{-M-L+2} & \cdots & Z_{2M}^{-M-L+2} \\ Z_1^1 & \cdots & Z_M^1 & Z_{M+1}^{-M-L+3} & \cdots & Z_{2M}^{-M-L+3} \\ \vdots & & \vdots & \vdots & & \vdots \\ Z_1^{L-2} & \cdots & Z_M^{L-2} & Z_{M+1}^{-M} & \cdots & Z_{2M}^{-M} \end{bmatrix}$$

$$\overleftrightarrow{Z}_B = \begin{bmatrix} Z_1^1 & \cdots & Z_M^1 & Z_{M+1}^{-M-L+3} & \cdots & Z_{2M}^{-M-L+3} \\ Z_1^2 & \cdots & Z_M^2 & Z_{M+1}^{-M-L+4} & \cdots & Z_{2M}^{-M-L+4} \\ \vdots & & \vdots & \vdots & & \vdots \\ Z_1^{L-1} & \cdots & Z_M^{L-1} & Z_{M+1}^{-M+1} & \cdots & Z_{2M}^{-M+1} \end{bmatrix}$$

$\overleftrightarrow{Z}_B$ can be factorized by $\overleftrightarrow{Z}_A$ and a diagonal matrix, for instance as follows:

$$\overleftrightarrow{Z}_B = \begin{bmatrix} Z_1^1 & \cdots & Z_M^1 & Z_{M+1}^{-M-L+3} & \cdots & Z_{2M}^{-M-L+3} \\ Z_1^2 & \cdots & Z_M^2 & Z_{M+1}^{-M-L+4} & \cdots & Z_{2M}^{-M-L+4} \\ \vdots & & \vdots & \vdots & & \vdots \\ Z_1^{L-1} & \cdots & Z_M^{L-1} & Z_{M+1}^{-M+1} & \cdots & Z_{2M}^{-M+1} \end{bmatrix} \begin{bmatrix} Z_1 & & 0 \\ & \ddots & \\ 0 & & Z_{2M} \end{bmatrix}$$

$$\overleftrightarrow{Z}_B = \overleftrightarrow{Z}_A * \text{diag}([Z_1 \ \ldots \ Z_{2M}]) = \overleftrightarrow{Z}_A \overleftrightarrow{\Phi}$$

where $$\ddot{\Phi} = \begin{bmatrix} Z_1 & & 0 \\ & \ddots & \\ 0 & & Z_{2M} \end{bmatrix} \equiv \begin{bmatrix} e^{-j\kappa\rho_1} & & 0 \\ & \ddots & \\ 0 & & e^{-j\kappa\rho_{2M}} \end{bmatrix}$$

which demonstrates the rotational or shift invariant property.

Similarly, for the LR Super Toeplitz matrix model. The $\vec{U}$ matrix in the LR super Toeplitz matrix model may be written in the following form.

$$\vec{U} = \begin{bmatrix} Z_1^{L-1} & \cdots & Z_M^{L-1} & Z_{M+1}^{-M+1} & \cdots & Z_{2M}^{-M+1} \\ Z_1^{L-2} & \cdots & Z_M^{L-2} & Z_{M+1}^{-M} & \cdots & Z_{2M}^{-M} \\ \vdots & & \vdots & \vdots & & \vdots \\ Z_1^0 & \cdots & Z_M^0 & Z_{M+1}^{-M-L+2} & \cdots & Z_{2M}^{-M-L+2} \end{bmatrix}$$

A pair of submatrices ($\vec{U}_A$ and $\vec{U}_B$) that are used to form the matrix pencil in the later step may be modelled by removing the first row of $\vec{U}$ to form $\vec{U}_A$, and by removing the last row of $\vec{U}$ to form $\vec{U}_B$, which can be written in the following form. Rotational Invariance:

$$\vec{U}_A = \begin{bmatrix} Z_1^{L-2} & \cdots & Z_M^{L-2} & Z_{M+1}^{-M} & \cdots & Z_{2M}^{-M} \\ Z_1^{L-3} & \cdots & Z_M^{L-3} & Z_{M+1}^{-M-1} & \cdots & Z_{2M}^{-M-1} \\ \vdots & & \vdots & \vdots & & \vdots \\ Z_1^0 & \cdots & Z_M^0 & Z_{M+1}^{-M-L+2} & \cdots & Z_{2M}^{-M-L+2} \end{bmatrix}$$

$$\vec{U}_B = \begin{bmatrix} Z_1^{L-1} & \cdots & Z_M^{L-1} & Z_{M+1}^{-M+1} & \cdots & Z_{2M}^{-M+1} \\ Z_1^{L-2} & \cdots & Z_M^{L-2} & Z_{M+1}^{-M} & \cdots & Z_{2M}^{-M} \\ \vdots & & \vdots & \vdots & & \vdots \\ Z_1^1 & \cdots & Z_M^1 & Z_{M+1}^{-M-L+3} & \cdots & Z_{2M}^{-M-L+3} \end{bmatrix}$$

In addition, $\vec{U}_B$ can be factorized by $\vec{U}_A$ and a diagonal matrix, as follows:

$$\vec{U}_B = \begin{bmatrix} Z_1^{L-2} & \cdots & Z_M^{L-2} & Z_{M+1}^{-M} & \cdots & Z_{2M}^{-M} \\ Z_1^{L-3} & \cdots & Z_M^{L-3} & Z_{M+1}^{-M-1} & \cdots & Z_{2M}^{-M-1} \\ \vdots & & \vdots & \vdots & & \vdots \\ Z_1^0 & \cdots & Z_M^0 & Z_{M+1}^{-M-L+2} & \cdots & Z_{2M}^{-M-L+2} \end{bmatrix} \begin{bmatrix} Z_1 & & 0 \\ & \ddots & \\ 0 & & Z_{2M} \end{bmatrix}$$

$$\vec{U}_B = \vec{U}_A * \text{diag}([Z_1 \cdots Z_{2M}]) = \vec{U}_A \ddot{\Phi}$$

$$\ddot{\Phi} = \begin{bmatrix} Z_1 & & 0 \\ & \ddots & \\ 0 & & Z_{2M} \end{bmatrix} \equiv \begin{bmatrix} e^{-j\kappa\rho_1} & & 0 \\ & \ddots & \\ 0 & & e^{-j\kappa\rho_{2M}} \end{bmatrix}$$

A super Matrix Pencil problem as utilized herein may be solved based on a LR super Hankel/Toeplitz matrix as follows. Having established above rotational invariant property, i.e., $\vec{Z}_B = \vec{Z}_A \ddot{\Phi}$, and $\vec{U}_B = \vec{U}_A \ddot{\Phi}$, Super matrix pencil pair [$\vec{H}_1$, $\vec{H}_2$] (or equivalently [$\vec{H}_1^H \vec{H}_1$, $\vec{H}_1^H \vec{H}_2$]) for LR Super Hankel and matrix pencil pair for LR Super Toeplitz [$\vec{T}_1$, $\vec{T}_2$] (or equivalently [$\vec{T}_1^H \vec{T}_1$, $\vec{T}_1^H \vec{T}_2$]) and the associated solver can be formulated based on the following. The duality exists for Hankel~Toeplitz, $\vec{Z} \sim \vec{U}$, $\vec{Z}_A \sim \vec{U}_A$, $\vec{Z}_B \sim \vec{U}_B$, $\vec{H} \sim \vec{T}$, $\vec{T}_1 \sim \vec{H}_1$ and $\vec{T}_2 \sim \vec{H}_2$ which means the formula below may be utilized by replacing current symbols with dual symbols.

Given Super Hankel matrix $\vec{H}$, by definition, $\vec{H} = \vec{H}_{Signal} + \vec{N} = \vec{Z} \vec{F} \vec{Y} + \vec{N}$. $\vec{H}_1$, which is $\vec{H}$ with the last row removed, is formed with high SNR, $\vec{H}_1 \cong \vec{Z}_A (\vec{F} \vec{Y})$. $\vec{H}_2$, which is $\vec{H}$ with the first row removed, is formed with high SNR, $\vec{H}_2 \cong \vec{Z}_B (\vec{F} \vec{Y}) = \vec{Z}_A \ddot{\Phi} (\vec{F} \vec{Y})$ where $\ddot{\Phi} = \text{diag}[e^{-j\kappa\rho_1} \, e^{-j\kappa\rho_2} \cdots e^{-j\kappa\rho_{2M}}]$.

The matrix pencil [$\vec{H}_1^H \vec{H}_1$, $\vec{H}_1^H \vec{H}_2$] may be formed and its generalized eigenvalues [$\mu_1 \, \mu_2 \ldots \mu_{2M}$] may be solved via QZ decomposition (e.g., $\vec{H}_1^H \vec{H}_2 \varepsilon = \mu \vec{H}_1^H \vec{H}_1 \varepsilon$, where $\mu \in [\mu_1 \, \mu_2 \ldots \mu_{2M}]$ is the generalized eigen value and $\varepsilon$ the corresponding generalized eigen vector so $\mu_{1 \ldots 2M}$ are also the eigenvalues of $(\vec{H}_1^H \vec{H}_1)^{-1} \vec{H}_1^H \vec{H}_2$). Conceptually this may be equivalent to solving the generalized eigenvalues of matrix pencil [$\vec{H}_1$, $\vec{H}_2$].

For any eigenvalue y of the matrix pencil [$\vec{H}_1^H \vec{H}_1$, $\vec{H}_1^H \vec{H}_2$], $\det\{\mu(\vec{H}_1^H \vec{H}_1) - \vec{H}_1^H \vec{H}_2\} = 0$ can be satisfied, such that $$\rightarrow \det\{\vec{H}_1^H \vec{Z}_A (\mu I - \ddot{\Phi})(F\vec{Y})\} =$$

$$0 \rightarrow \det(\mu I - \ddot{\Phi}) = 0 \rightarrow \prod_{i=1}^{2M}(\mu - e^{-j\kappa\rho_i}) = 0 \rightarrow e^{-j\kappa\rho_i} = \mu_i \rightarrow \rho_i = \frac{\arg(\mu_i)}{-\kappa},$$

$$\text{and} \rightarrow \cos\theta_i \sin\varphi_i = \frac{\arg(\mu_i)}{-\kappa} \text{ may also be satisfied,}$$

with eigenvalues having unit magnitudes (e.g., 1).

Accordingly, $\theta$ and $\varphi$ can be solved based on the $N_s$ eigenvalues whose magnitudes are closest to 1 (∵ they correspond to main diagonals of $\ddot{\Phi}$). For ULA, where it may not be possible to unambiguously resolve both the elevation and azimuth angles, an elevation angle may be assumed for evaluating the azimuth angle. At least $N_s$ eigenvalues, e.g., $\min\{L-1, 2M\} \geq N_s$, may be used.

Source amplitudes may be the main diagonals of $\vec{F} \cong (\vec{Z}^H \vec{Z})^{-1} \vec{Z}^H \vec{H} \vec{Y}^H (\vec{Y} \vec{Y}^H)^{-1}$, with $\vec{Z}$, $\vec{Y}$ formed with $\mu_i$'s (valid for square or tall matrix $\vec{Z}$). For non-square/tall matrix $\vec{Z}$ case amplitudes may be found by forming a steering matrix (A) with columns of steering vector pointing to the solved angles and solving for the unknown amplitude vector ($\alpha$) based on the known linear relationship (A$\alpha$=s) (e.g., $\hat{s} = (A^H A)^{-1} A^H A\alpha$ in the least-squares sense). Alternatively, amplitude can be found by DFT's of $\hat{s}$ tuned to $\mu_i$'s.

A vertically concatenated super Hankel/Toeplitz matrix may be implemented in accordance with the following. A top-bottom (TB) Super Hankel Matrix may be formed by concatenating Forward and Backward Hankel matrices vertically and can be written in the following equation. 2L targets is modelled in the TB Super Hankel/Toeplitz instead of 2M which translate to an index from 1 to L in a forward Hankel/Toeplitz matrix and an index from L+1 to 2L in the backward Hankel/Toeplitz matrix.

$$\vec{H}_{Signal} = \begin{bmatrix} \vec{H}_{Signal} \\ \overleftarrow{H}_{Signal} \end{bmatrix} = \begin{bmatrix} z_1^0 & \cdots & z_L^0 \\ z_1^1 & \cdots & z_L^1 \\ \vdots & & \\ z_1^{L-1} & \cdots & z_L^{L-1} \\ & & & z_{L+1}^{-M-L+2} & \cdots & z_{2L}^{-M-L+2} \\ & & & z_{L+1}^{-M-L+3} & \cdots & z_{2L}^{-M-L+3} \\ & & & & \vdots \\ & & & z_{L+1}^{-M+1} & \cdots & z_{2L}^{-M+1} \end{bmatrix}$$

$$\begin{bmatrix} \alpha_1 & \cdots & 0 & & & \\ \vdots & \ddots & \vdots & & 0 & \\ 0 & \cdots & \alpha_L & & & \\ & & & \alpha_{L+1}^* & \cdots & 0 \\ & 0 & & \vdots & \ddots & \vdots \\ & & & 0 & \cdots & \alpha_{2L}^* \end{bmatrix} \begin{bmatrix} z_1^0 & z_1^1 & \cdots & z_1^{M-1} \\ \vdots & \vdots & \cdots & \vdots \\ z_L^0 & z_L^1 & \cdots & z_L^{M-1} \\ z_{L+1}^0 & z_{L+1}^1 & \cdots & z_{L+1}^{M-1} \\ \vdots & \vdots & \cdots & \vdots \\ z_{2L}^0 & z_{2L}^1 & \cdots & z_{2L}^{M-1} \end{bmatrix} = \vec{O}\vec{F}\vec{P}$$

Likewise, the vertically concatenated super Toeplitz matrix (TB super Toeplitz matrix) may be formed by concatenating the Forward and Backward Hankel matrices and can be written in the following equation. A super Toeplitz Matrix (2L targets modelled in the Super Toeplitz) may be implemented as follows:

$$\vec{T}_{Signal} = \begin{bmatrix} \vec{T}_{Signal} \\ \overleftarrow{T}_{Signal} \end{bmatrix} = \begin{bmatrix} z_1^{L-1} & \cdots & z_L^{L-1} \\ z_1^{L-2} & \cdots & z_L^{L-2} \\ \vdots & & \\ z_1^0 & \cdots & z_L^0 \\ & & & z_{L+1}^{-M+1} & \cdots & z_{2L}^{-M+1} \\ & & & z_{L+1}^{-M} & \cdots & z_{2L}^{-M} \\ & & & & \vdots \\ & & & z_{L+1}^{-M-L+2} & \cdots & z_{2L}^{-M-L+2} \end{bmatrix}$$

$$\begin{bmatrix} \alpha_1 & \cdots & 0 & & & \\ \vdots & \ddots & \vdots & & 0 & \\ 0 & \cdots & \alpha_L & & & \\ & & & \alpha_{L+1}^* & \cdots & 0 \\ & 0 & & \vdots & \ddots & \vdots \\ & & & 0 & \cdots & \alpha_{2L}^* \end{bmatrix} \begin{bmatrix} z_1^0 & z_1^1 & \cdots & z_1^{M-1} \\ \vdots & \vdots & \cdots & \vdots \\ z_L^0 & z_L^1 & \cdots & z_L^{M-1} \\ z_{L+1}^0 & z_{L+1}^1 & \cdots & z_{L+1}^{M-1} \\ \vdots & \vdots & \cdots & \vdots \\ z_{2L}^0 & z_{2L}^1 & \cdots & z_{2L}^{M-1} \end{bmatrix} = \vec{B}\vec{F}\vec{P}$$

If the number of sources is known, while creating the TB Super Hankel/Toeplitz Matrix one can readily make $2L=N_s$ (or $N_s+1$ for odd values) so the number of eigenvalues to be computed equals to the number of sources. This may improve the SNR as a stronger averaging will take place in the matrix pencil.

Super matrix pencil methods as based on TB super Hankel/Toeplitz may be useful for the recovery the DoA's of targets, utilizing rotational invariant property. The $\vec{Z}$ matrix in the LR Super Hankel matrix model may be written in the following form:

$$\vec{P} = \begin{bmatrix} z_1^0 & z_1^1 & \cdots & z_1^{M-1} \\ \vdots & \vdots & \cdots & \vdots \\ z_L^0 & z_L^1 & \cdots & z_L^{M-1} \\ z_{L+1}^0 & z_{L+1}^1 & \cdots & z_{L+1}^{M-1} \\ \vdots & \vdots & \cdots & \vdots \\ z_{2L}^0 & z_{2L}^1 & \cdots & z_{2L}^{M-1} \end{bmatrix}$$

A pair of submatrices ($\vec{P}_A$ and $\vec{P}_B$) that are used to form the matrix pencil in the later step may be modelled by removing the last column of P to form EA, and by removing the first column of $\vec{P}$ to form $\vec{P}_B$, which can be written in the following form.

$$\vec{P}_A = \begin{bmatrix} z_1^0 & z_1^1 & \cdots & z_1^{M-2} \\ \vdots & \vdots & \cdots & \vdots \\ z_L^0 & z_L^1 & \cdots & z_L^{M-2} \\ z_{L+1}^0 & z_{L+1}^1 & \cdots & z_{L+1}^{M-2} \\ \vdots & \vdots & \cdots & \vdots \\ z_{2L}^0 & z_{2L}^1 & \cdots & z_{2L}^{M-2} \end{bmatrix}$$

$$\vec{P}_B = \begin{bmatrix} z_1^1 & z_1^1 & \cdots & z_1^{M-1} \\ \vdots & \vdots & \cdots & \vdots \\ z_L^1 & z_L^1 & \cdots & z_L^{M-1} \\ z_{L+1}^1 & z_{L+1}^1 & \cdots & z_{L+1}^{M-1} \\ \vdots & \vdots & \cdots & \vdots \\ z_{2L}^1 & z_{2L}^1 & \cdots & z_{2L}^{M-1} \end{bmatrix}$$

Accordingly, $\vec{P}_B$ can be factorized by $\vec{P}_A$ and a diagonal matrix, for instance in the following equation:

$$\vec{P}_B = \begin{bmatrix} Z_1 & & 0 \\ & \ddots & \\ 0 & & Z_{2L} \end{bmatrix} \begin{bmatrix} z_1^0 & z_1^1 & \cdots & z_1^{M-2} \\ \vdots & \vdots & \cdots & \vdots \\ z_L^0 & z_L^1 & \cdots & z_L^{M-2} \\ z_{L+1}^0 & z_{L+1}^1 & \cdots & z_{L+1}^{M-2} \\ \vdots & \vdots & \cdots & \vdots \\ z_{2L}^0 & z_{2L}^1 & \cdots & z_{2L}^{M-2} \end{bmatrix}$$

$$\vec{P}_B = \mathrm{diag}([Z_1 \ \ldots \ Z_{2L}]) * \vec{P}_A = \vec{\Phi}\vec{P}_A$$

where $$\vec{\Phi} = \begin{bmatrix} Z_1 & & 0 \\ & \ddots & \\ 0 & & Z_{2L} \end{bmatrix} \equiv \begin{bmatrix} e^{-jk\rho_1} & & 0 \\ & \ddots & \\ 0 & & e^{-jk\rho_{2L}} \end{bmatrix}$$

which demonstrates a rotational or shift invariant property.

In some embodiments, the super matrix pencil problem is solved based on a top-bottom (TB) super Hankel/Toeplitz matrix as follows. Referring to the above rotational invariant property, $\vec{P}_B = \vec{\Phi}\vec{P}_A$, the super matrix pencil pair $[\vec{H}_1, \vec{H}_2]$ (or equivalently $[\vec{H}_1\vec{H}_1^H, \vec{H}_2\vec{H}_1^H]$) for TB super Hankel and matrix pencil pair for TB super Toeplitz $[\vec{\Phi}_1, \vec{\Phi}_2]$ (or equivalently $[\vec{T}_1\vec{T}_1^H, \vec{T}_2\vec{T}_1^H]$) and the associated solver can be formulated based on the following. The duality exists for Hankel~Toeplitz, $\vec{O} \sim \vec{B}$, $\vec{H} \sim \vec{T}$, $\vec{T}_1 \sim \vec{H}_1$ and $\vec{T}_2 \sim \vec{H}_2$ which means the formula below may be used with current symbols replaced by dual symbols. Given Super Hankel matrix $\vec{H}$, by definition, $\vec{H} = \vec{H}_{Signal} + \vec{N} = \vec{N}\vec{F}\vec{P} + \vec{N}$. $\vec{H}_1$, which is $\vec{H}$ with the last column removed, is formed with high SNR, $\vec{H}_1 \cong (\vec{N}\vec{F})\vec{P}_A$. $\vec{H}_2$, which is $\vec{H}$ with the first column removed, is formed. By definition with high SNR, $\vec{H}_2 \cong (\vec{N}\vec{F})\vec{P}_B = (\vec{N}\vec{F})\vec{\Phi}\vec{P}_A$ where $\vec{\Phi} = \mathrm{diag}[e^{-jk\rho_1} e^{-jk\rho_2} \ldots e^{-jk\rho_{2L}}]$ The matrix pencil $[\vec{H}_1\vec{H}_1^H, \vec{H}_2\vec{H}_1^H]$ may be formed and its generalized eigenvalues $[\mu_1 \ \mu_2 \ \ldots \ \mu_{2M}]$ solved via QZ decomposition (e.g., $\vec{H}_2\vec{H}_1^H \varepsilon = \mu \vec{H}_1 \vec{H}_1^H \varepsilon$, where $\mu \varepsilon [\mu_1 \ \mu_2 \ \ldots \ \mu_{2M}]$ is the generalized eigen value and E the corresponding generalized eigen vector so $\mu_{1 \ \ldots \ 2M}$ are also the eigenvalues of $(\vec{H}_1 \vec{H}_1^H)^{-1} \vec{H}_2 \vec{H}_1^H)$. Conceptually this may be equivalent to solving the generalized eigenvalues of matrix pencil $[\vec{H}_1, \vec{H}_2]$. For instance, for any eigenvalue $\mu$ of the matrix pencil $[\vec{H}_1 \vec{H}_1^H, \vec{H}_2 \vec{H}_1^H]$, $\det\{\mu(\vec{H}_1 \vec{H}_1^H) - \vec{H}_2 \vec{H}_1^H\} = 0$ may be satisfied, such that $$\rightarrow \det\{\vec{OF}(\mu I - \vec{\Phi})\vec{P}_A \vec{H}_1^H\} = 0 \rightarrow \det(\mu I - \vec{\Phi}) = 0 \rightarrow \prod_{i=1}^{2M}(\mu - e^{-jk\rho_i}) =$$

$$0 \rightarrow e^{-jk\rho i} = \mu_i \rightarrow \rho_i = \frac{\arg(\mu_i)}{-\kappa} \rightarrow \cos\theta_i \sin\varphi_i = \frac{\arg(\mu_i)}{-\kappa}$$

May also be satisfied with correct eigenvalues should have unit magnitudes (e.g., 1).

Accordingly, $\theta$ and $\varphi$ can be solved based on the $N_s$ eigenvalues whose magnitudes are closest to 1 ($\because$ they correspond to main diagonals of $\vec{\Phi}$) For ULA, it may not be possible to unambiguously resolve both the elevation and azimuth angles. Usually an elevation angle is assumed for evaluating the azimuth angle. At least $N_s$ eigenvalues, e.g., $\min\{2L, M-1\} \geq N_s$, may be used.

Source amplitudes may be the main diagonals of $\vec{F} \cong (\vec{N}^H \vec{N})^{-1} \vec{N}^H \vec{H} \vec{P}^H (\vec{P} \vec{P}^H)^{-1}$ with $\vec{N}$, $\vec{P}$ formed with $\mu_i$'s (valid for square or fat matrix $\vec{P}$). For a non-square/fat matrix $\vec{P}$ case, amplitudes may be found by forming a steering matrix (A) with columns of steering vector pointing to the solved angles and solving for the unknown amplitude vector ($\alpha$) based on the known linear relationship (A$\alpha$=s) (e.g. $\hat{s}=(A^H A)^{-1} A^H A\alpha$ in the least-squares sense). Alternatively, amplitude can be found by DFT's of $\hat{s}$ tuned to $\mu_i$'s.

As examples, the Specification describes and/or illustrates aspects useful for implementing the claimed disclosure by way of various circuits or circuitry which may be illustrated as or using terms such as blocks, modules, device, system, unit, controller, interface circuitry, MCPU, and/or other circuit-type depictions (e.g., reference numerals 120 and 130 of FIGS. 1, and 220 and 230 of FIG. 2 may depict a block/module as described herein). Such circuits or circuitry may be used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU or MCPU), in one example the logic circuitry may carry out a process or method (sometimes "algorithm") by performing sampling, transformation, oversampling and inverse transformation. In another example, logic circuitry may carry out a process or method by performing these same activities/operations and, various other radar processing steps in addition. Further operations, processes or methods in this context would be recognized in connection with the functions/activities associated with the processes depicted in FIGS. 3-7.

For example, in certain of the above-discussed embodiments, one or more modules are discrete logic circuits or programmable logic circuits configured and arranged for implementing these operations/activities, as may be carried out in the approaches shown in FIGS. 3-7. In certain embodiments, such a programmable circuit is one or more computer circuits, including memory circuitry for storing and accessing a program to be executed as a set (or sets) of instructions (and/or to be used as configuration data to define how the programmable circuit is to perform). An algorithm or process as described in FIG. 3 and/or with the matrix computation(s) in one or more of FIGS. 4-7, or as otherwise characterized herein for activities such as computing a target's DoA may be used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, some embodiments are directed to fewer than all steps and/or components, such as to carry out one or more types of matrix generation and subsequent use thereof. Such modifications do not depart from the true spirit and scope of various aspects of the disclosure, including aspects set forth in the claims.

What is claimed is:

1. A method comprising:
    processing in a radar system, the processing including:
        mathematically processing digital signals representative of received reflections of radar signals transmitted towards a target to provide or construct a matrix pencil based on or as a function of a forward-backward matrix;
        computing eigenvalues of the matrix pencil; and
        outputting an estimation of a direction of arrival (DoA) of the target based on the computed eigenvalues of the matrix pencil; and
    transmitting, in a communication circuit of the radar system, the radar signals and receiving the reflections of the transmitted radar signals;
    wherein mathematically processing includes processing the digital signals as part of an input array measurement vector, and, after computing the eigenvalues of the matrix pencil, selecting the computed eigenvalues of the matrix pencil with magnitudes within a predefined range surrounding a magnitude of 1 to use for the outputting of the estimation of the DoA of the target.

2. The method of claim 1, wherein mathematically processing includes forming multiple matrices, at least two of which are characterized as a diagonal-constant matrix having a diagonal direction consistent with either: each ascending diagonal from left to right being constant, or each descending diagonal from left to right being constant.

3. The method of claim 1, wherein the forward-backward matrix includes or refers to a matrix having multiple concatenated sub-matrices, each of which is characterized as a diagonal-constant matrix having a diagonal direction consistent with either: each ascending diagonal from left to right being constant or each descending diagonal from left to right being constant.

4. The method of claim 1, wherein the steps of mathematically processing, computing, and outputting an estimation of the DoA use high-resolution imaging based on resolving a number of targets greater than two-thirds of a number of rows or a number of columns of the matrix.

5. The method of claim 1, wherein the steps of mathematically processing, computing, and outputting do not include providing or estimating a number of signal sources and eliminating noise eigenvectors in an eigenvector matrix or eigenvector matrices.

6. The method of claim 1, further comprising computing eigenvalue phases corresponding to the computed eigenvalues having a magnitude within a predefined range, and wherein said outputting an estimation of the DoA is in response to computing the eigenvalue phases.

7. The method of claim 1, wherein the steps of mathematically processing, computing, and outputting do not include constructing and Eigen-decomposing spatially smoothed signal covariance matrices.

8. The method of claim 1, wherein computing eigenvalues of the matrix pencil includes computing eigenvalue phases of the matrix pencil.

9. The method of claim 1, wherein the steps of mathematically processing, computing, and outputting include providing the DoA within an angular resolution of less than 0.05 in a normalized frequency scale of 0-1.

10. The method of claim 1, wherein outputting an estimation of the DoA of the target based on eigenvalue phases of the matrix pencil is based on or a function of:
eigenvalues of the matrix pencil; and
eigenvalue phases corresponding to certain of the eigenvalues having a magnitude within a predefined range.

11. The method of claim 1, wherein mathematically processing the digital signals includes:
concatenating a forward matrix and a backward matrix respectively constructed of the digital signals, horizontally from left to right; and
constructing the matrix pencil from the matrices.

12. The method of claim 1, wherein mathematically processing the digital signals includes:
concatenating a forward matrix and a backward matrix respectively constructed of the reflections, vertically from top to bottom; and
constructing the matrix pencil from the matrices.

13. The method of claim 1, wherein mathematically processing the digital signals includes generating forward and backward Hankel matrices in which values of rows and columns of the forward and backward matrices are chosen so the resulting matrix is a square or has one more row than columns.

14. The method of claim 1, wherein mathematically processing the digital signals includes generating forward and backward Toeplitz matrices in which values of the rows and columns of the forward and backward matrices are chosen so the resulting matrix is a square or has one more column than rows.

15. The method of claim 1, wherein the forward-backward matrix includes forward and backward matrices having the same number of rows and columns.

16. An apparatus comprising:
communication circuitry to transmit radar signals and to receive reflections of the radar signals from a target; and
processing circuitry to:
mathematically process digital signals representative of the received reflections of the radar signals to provide or construct a matrix pencil based on or as a function of a forward-backward matrix;
compute eigenvalues of the matrix pencil; and
output an estimation of a direction of arrival (DoA) of the target based on the computed eigenvalues of the matrix pencil,
wherein the processing circuitry is to further select the computed eigenvalues of the matrix pencil with magnitudes within a predefined range surrounding a magnitude of 1 to use for the outputting of the estimation of the DoA of the target.

17. The apparatus of claim 16, wherein the processing circuitry is to process the digital signals as part of an input array measurement vector.

18. The apparatus of claim 16, wherein the processing circuitry is to form multiple matrices, at least two of which are characterized as a diagonal-constant matrix having a diagonal direction consistent with either: each ascending diagonal from left to right being constant, or each descending diagonal from left to right being constant.

19. The apparatus of claim 16, wherein the forward-backward matrix includes or refers to a matrix having multiple concatenated sub-matrices, each of which is characterized as a diagonal-constant matrix having a diagonal direction consistent with either: each ascending diagonal from left to right being constant, or each descending diagonal from left to right being constant.

* * * * *